UNITED STATES PATENT OFFICE.

J. A. CUTTING AND L. H. BRADFORD, OF BOSTON, MASSACHUSETTS.

IMPROVEMENT IN PHOTOLITHOGRAPHY.

Specification forming part of Letters Patent No. 19,626, dated March 16, 1858; Reissue No. 1,019, dated July 31, 1860.

*To all whom it may concern:*

Be it known that we, JAMES A. CUTTING and LODOWICK H. BRADFORD, both of Boston, in the county of Suffolk and State of Massachusetts, have invented certain new and useful Improvements in Photolithographing; and we hereby declare the following to be a full, clear, and exact description of the same, and of the peculiarities which distinguish them from anything heretofore discovered or known.

Our invention has for its object the production of a positive photographic picture upon and in union with the surface of a lithographic stone, from which impressions may be taken by the ordinary process of lithographic printing, by which we are enabled to greatly multiply the results of photography and avoid to some extent the tedious and expensive process of drawing as at present practiced by lithographers.

In the present or ordinary process of preparing a lithographic stone previous to printing, the surface of the stone after the drawing is completed is washed or coated with a solution of gum-arabic in acidulated water. The gum thus applied, when allowed to dry, enters into a close union with the stone, or adheres to it with great tenacity, so that it cannot readily be removed by washing, and when wet protects the stone from uniting with the ink in the printing process. In the process of photolithography it is found that gum-arabic adheres too closely to the stone after being dried, and is not readily removed by washing from those parts not fixed by light and salts of chromium. In the experiments heretofore made in photolithography it has been found impracticable to use this gum in such a manner as to make a picture in combination with the stone.

To remedy this difficulty is the object of our invention, which consists in the employment of gum-arabic, which has been modified in its power of intimate union with the stone, as hereinafter set forth, at the same time that it is capable of being fixed by the action of light and chromic salts, for the purpose of enabling us to form a printing-surface with the stone in connection with soap, inks, or resins, where the light has not acted. We have also discovered that when a stone is coated with the gum so prepared in connection with bichromate of potash, and a picture impressed thereon by means of the light, and it is subsequently submitted to the action of a solution of soap, the unlighted portions of the gum are readily and expeditiously removed, while the lighted portions are not injuriously affected thereby, at the same time that the soap performs its well-known duty of forming the insoluble soap of lime with the stone making the printing-surface. In all the processes heretofore invented for the purpose of printing photographically from a lithographic stone in which the chromic salts and organic matter are used the composition applied has constituted the printing-surface, as is evidenced by the fact that the ink adheres to those parts where the light has acted and rendered the organic matter insoluble, while in our process the printing-surface is the stone, in combination with soap, fats, oils, or resins where the light has not acted. As an example, we instance the process of M. Poitevin, patented in France November 4, 1855, in which he applies a coating of any organic matter like gum-arabic, albumen, fibrine, gluten, gelatine, &c., with a solution of bichromate of potash to any surface of lithographic stone, metal, glass, or suitable material, and prints with a greasy ink from the surface of said compound, which has been made insoluble by the action of light, and is thus made to adhere to the surface used. These processes differ entirely from our process, insomuch that we produce a positive picture by the camera-obscura or positive screen in connection with the surface of the stone, while negative pictures founded on the decomposition of the materials would be the claimed results of the same exposure by such means as is cited above.

We will now proceed to describe our invention and set forth more fully its nature and the manner in which we have carried it out.

The stone, after being prepared in a manner which will be explained hereinafter, has the following solution applied to its surface: water, one quart; gum-arabic, four ounces; sugar, one hundred and sixty grains; bichromate of potash, one hundred and sixty grains, the sugar retarding the immediate fixing of the gum-arabic with the stone, and the chromic salt causing it when exposed to light to become firmly fixed or much less soluble. The stone thus coated is preserved in the dark until the coating is dried to appearance. Then it may be exposed in the camera a suitable length of time to fix the gum on those parts of the stone where the lights are to appear; or it may be covered with a screen, print, or picture to be reproduced and exposed to the light. After it is thus acted upon by the light, the stone is washed with a solution of soap, which dissolves the gum and attacks the stone in the parts not acted upon by the light, fixing itself or forming an insoluble lime soap with the stone, thus making the printing-surface. Where the coating of gum and other ingredients has been entirely protected from the light, it is readily removed by the washing, and the soap has free access to the stone. The consequence is a union of the soap with the stone. Where, on the contrary, the light has acted, the coating of gum-arabic is rendered insoluble in proportion to such action, and the stone is protected thereby from being affected with the soap and after application of printer's ink in those parts. The stone, having been thoroughly washed with clean water, is dried, and the gum enters into close union with it. A coating of greasy printer's ink, or an ink such as is used by lithographers for transfer-work, is then applied to its whole surface, which, uniting with the soap already there in the stone, serves to give additional strength to the work, while the gum protects those parts where it lies from its action. After remaining thus a suitable time, the ink is washed off from the stone with spirits of turpentine, and the stone is wet with water and rolled up in the usual manner of lithographic printing. The most delicate grades and tints of light and shade may thus be produced in the stone by the combination with it of the soap and grease of the ink to form the printing-surface, and the union of the gum-arabic with the stone to form the necessary resistant where the lights are to appear by means of photography true to nature as the photograph itself.

Previous to the commencement of the above-described process the stone is to be prepared, and the preparation will vary according to the nature of the subject to be reproduced. If it be a manuscript, a copy of a lithograph or line-engraving, or any plan or line drawing, without gradations of shade or shadow running the one into the other, a polished surface we consider best. This will not answer so well for portraits or landscapes and the like, where the variations of shade blend one with the other. In such case it is better to give the stone a roughened surface, or, in the language of the workman, it is "grained." On such a surface the coating of gum, &c., lies more uneven, according to the character of the grain, and is acted upon by the light accordingly, and thus the variations of intensity and the gradations of light and shade are grained, which makes it easy to print. Where a polished stone is used, the coating lies more even on the surface, and it is found that the variations of shade and shadow cannot be worked with that nicety necessary to produce a graduated picture—such as a portrait or view—which may be easily printed.

In preparing the chromated solution for the coating of the stone the proportions of the ingredients are by no means rigid. The sugar, we have found, may be replaced by other substances—such as molasses, acetic acid, various acetates not decomposable by bichromate of potash in the absence of light; or the solution of bichromate of potash and gum-arabic may be allowed to stand until it acetifies to the requisite point. We do not therefore confine ourselves to the exact proportions, nor even to the exact substances named, when there are equivalents for them, which may be used in their stead without departing from the essence of our invention; and in place of removing the unlighted portions of the gum-arabic coating by means of the direct application of soap they may be dissolved away with water or its equivalent, and oils, resins, or printing-inks applied after the stone has been dried, for the purpose of forming the insoluble soap in the stone necessary for the printing-surface. Such processes we consider to be the entire equivalent of the one above described, although they are neither as expeditious or efficient, in our opinion.

The quality of the soap employed is not rigid, though those containing a portion of resin will in general give the best results. The strength of the saponaceous solution is not material. We have found one-half a pound of soap to six quarts of water to answer the purpose.

We have heretofore spoken of our process as applied to a lithographic stone; but there is another substance which is sometimes used in place of stone by lithographers—namely, zinc, to which it may be applied, in which the insoluble soap of zinc would produce the printing-surface instead of lime, as is the case with stone.

We do not claim the use or discovery of the action of the salts of chromium upon gum-arabic or organic matter, by which such substances are made insoluble by the influence of light, in connection with a lithographic stone or plate of zinc, in any other manner than is set forth in this specification, or its equivalent.

We do not claim the use of the combination of gum-arabic with the chromic salts, in connection with a lithographic stone or plate of zinc for the purpose of forming a printing-surface, either by making a raised surface composed of the gum and oxide of chromium to receive the ink, or by decomposing it by the action of light in such a manner as to receive the ink in combination with the gum.

We do not claim the use of gum-arabic, sugar, and bichromate of potash, in connection with a lithographic stone or plate of zinc, in any manner that will produce negative pictures by exposure in the camera-obscura or positive pictures by negative screens, as is the case in the process of M. Poitevin, alluded to in this specification.

What we do claim, and desire to secure by Letters Patent, is—

1. The employment of a solution of gum-arabic sensitized by bichromate of potash or its equivalent, in combination with the surface of a lithographic stone or plate of zinc, when acted upon by light, as a resistant to the effects of a solution of soap and application of printer's ink, for the purpose of combining the soap and ink with the stone or plate of zinc, substantially as set forth in this specification.

2. The employment of sugar or its equivalent, in combination with gum-arabic and bichromate of potash, in connection with a lithographic stone or plate of zinc, for the purpose of modifying the adhesive quality of the coating to the stone or zinc in the parts not acted upon by the light, in the manner as set forth in the specification.

3. The employment of a solution of soap or its equivalent for the purpose of forming the printing-surface with the stone or plate of zinc, in combination with the sensitized gum-arabic, to produce the positive photographic picture, in the manner as set forth in this specification.

J. A. CUTTING.
L. H. BRADFORD.

Witnesses:
WILLIAM ROGERS,
D. H. COOLIDGE.